Figures 1, 2:
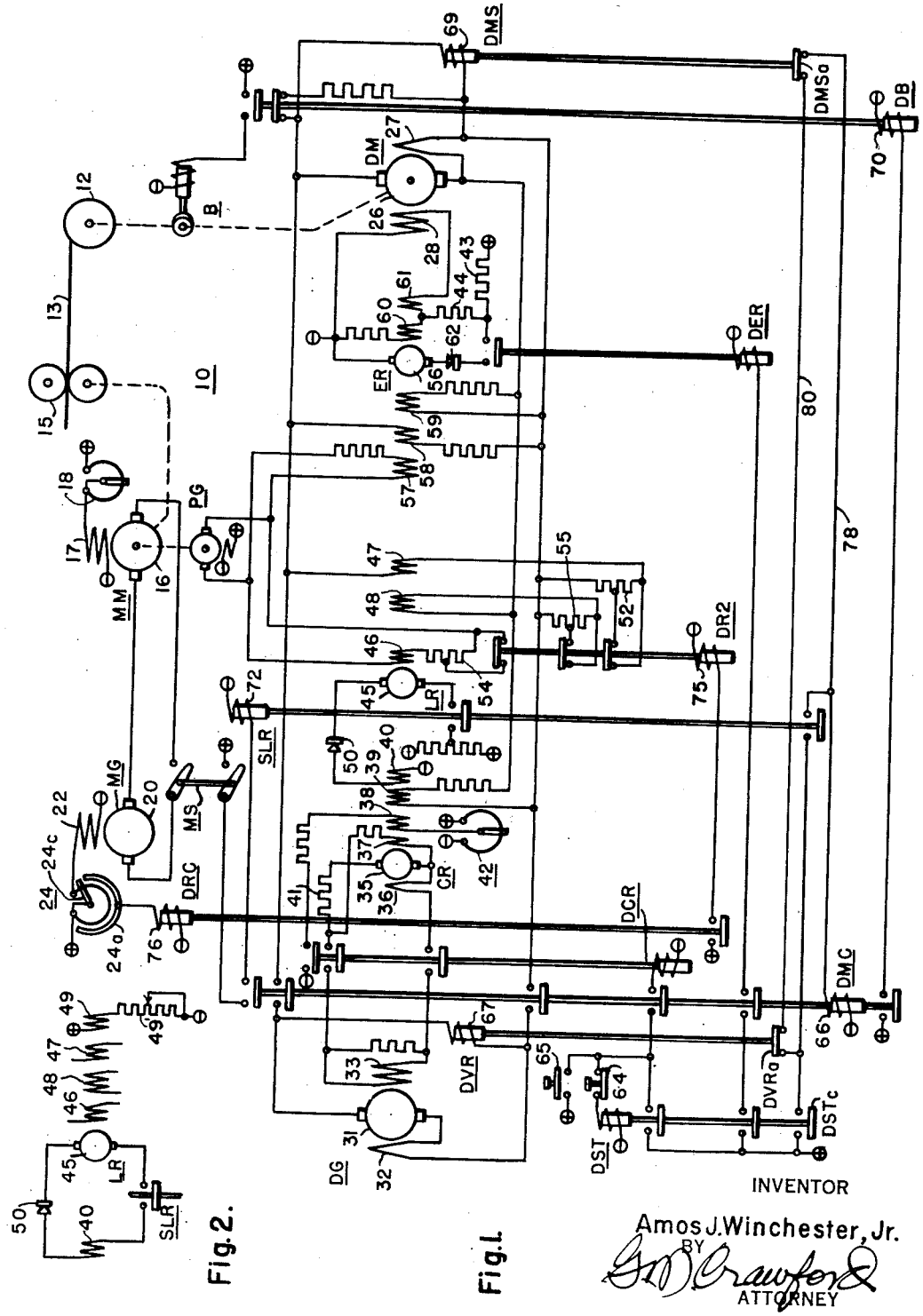

July 20, 1954

A. J. WINCHESTER, JR 2,684,458

REEL MOTOR CONTROL SYSTEM

Filed June 28, 1949

INVENTOR
Amos J. Winchester, Jr.
BY
G. D. Crawford
ATTORNEY

Patented July 20, 1954

2,684,458

UNITED STATES PATENT OFFICE 2,684,458

REEL MOTOR CONTROL SYSTEM

Amos J. Winchester, Jr., Lockport, N. Y., assignor to Westinghouse Electric Corporation, East Pittsburgh, Pa., a corporation of Pennsylvania Application June 28, 1949, Serial No. 101,746

11 Claims. (Cl. 318—6)

My invention relates, generally, to reel motor control systems, and it has reference in particular to a control system for a reel motor connected in driving relation with a delivery reel, such as may be used in coiling metal strip from a strip mill or the like.

Generally stated, it is an object of my invention to provide a reel motor control system that is simple and inexpensive to manufacture, and reliable and effective in operation.

More specifically, it is an object of my invention to provide, in a delivery reel motor control system, for regulating the speed of the reel motor in order to limit the free speed of the reel.

Another object of my invention is to provide, in a control system for a reel motor used with a mill, for normally controlling the energization of the reel motor in accordance with the armature current thereof and for controlling its energization in accordance with the speed of the mill when the strip breaks or when the reel is operating before the strip is threaded thereon.

Yet another object of my invention is to provide, in a control system for a reel motor associated with a strip mill, for using a regulating generator, which is responsive to a differential between the speed of the mill and the E. M. F. of the reel motor, for controlling the operation of a current-regulating generator when the reel reaches a predetermined speed relative to the speed of the mill.

It is an important object of my invention to provide, in a control system for a reel motor used in connection with mill apparatus, for utilizing a control generator, which is differentially responsive to the speeds of the reel motor and the mill apparatus for limiting the speed of the reel motor, and for recalibrating the control generator to vary the sensitivity thereof in accordance with the speed of the mill apparatus.

It is also an object of my invention to provide, in a control system for a reel motor, for transferring smoothly from current regulation to speed regulation of the reel motor.

Another important object of my invention is to provide, in a reel motor control system, for eliminating the usual relays used in transferring from current to speed regulation.

Other objects will in part be obvious, and will in part be described hereinafter.

In accordance with one embodiment of my invention, the minimum value of field excitation for a reel motor connected in driving relation with a delivery reel for winding a strip of metal from a strip mill is supplied from a constant potential bus, and coil build-up compensation is provided by a regulating generator, which is differentially responsive to the speed of the mill and to the E. M. F. of the reel motor. Electrical energy is supplied to the armature of the reel motor from a generator, the output voltage of which is controlled by a regulating generator which is normally responsive to the armature current of the reel motor. A speed-limiting field winding is provided on the regulating generator, and is connected through a blocking rectifier device to a constant potential bus. A speed-limiting regulating generator responsive to a differential between the speed of the mill and the E. M. F. of the reel motor is connected in opposition to the constant potential bus for energizing the speed-limiting field winding when the speed of the reel motor exceeds a predetermined value for a given speed of the mill. The field excitation of the speed-limiting generator is varied in accordance with the speed of the mill in order to increase the sensitivity of the speed-limiting generator at the lower values of mill speed.

For a more complete understanding of the nature and scope of my invention, reference may be made to the following detailed description, which may be read in connection with the accompanying drawing in which:

Fig. 1 is a diagrammatic view of a reel motor control system embodying the invention in one of its forms, and Fig. 2 is a diagrammatic view of a portion of an alternative control system showing a different circuit arrangement of the speed limit regulating generator of Fig. 1.

Referring to the drawing, the reference numeral 10 may denote generally a control system for a reel motor DM, which may be disposed in driving relation with a reel 12 for winding a strip of material 13 as it is delivered by the rolls of a mill stand 15.

The mill stand 15 may be driven by a mill motor MM having an armature 16 connected in driving relation with one of the rolls, and a field winding 17 which may be energized from a suitable source through a field rheostat 18. The armature 16 may be supplied with electrical energy from a mill generator MG having an armature 20 connected in circuit relation with the armature 16 through a main switch MS, and provided with a field winding 22. The field winding 22 may be energized from a suitable source of electrical energy through a main rheostat 24, which may be operated to vary the speed of the mill. A pilot generator PG may be connected in driving relation with the mill motor MM to provide a speed-indicating voltage.

The reel motor DM may comprise an armature 26 connected in driving relation wtih the reel 12, a series field winding 27 and a main field winding 28. Electrical energy may be supplied to the armature 26 from a delivery reel generator DG having an armature 31 connected in circuit relation with the armature 26, a series field winding 32 connected in circuit relation with the armature 31, and a main field winding 33.

In order to provide for maintaining a substantially constant tension in the strip 13, the output voltage of the generator DG may be controlled by a current-regulating generator CR comprising an armature 35, a self-energizing field winding 36, an anti-hunt field winding 37, a pattern field winding 38, a differential current field winding 39 and a speed-limiting field winding 40.

The armature 35 may be connected in circuit relation with the main field winding 33 of the generator DG, with the self-energizing field winding 36 and a calibrating resistor 41 connected in circuit relation therewith. The anti-hunt field winding 37 may be connected in shunt relation with the series circuit arrangement of the main field winding 33 and the self-energizing field winding 36. The pattern field winding 38 may be connected to a suitable source of electrical energy through a potentiometer 42 for determining the armature current for which the regulating generator CR will regulate. The current field winding 39 may be energized in accordance with the armature current of the reel motor DM being, for example, connected across the series field winding 27 in differential or opposed relation with the pattern field winding 38.

In order to provide for limiting the free speed of the reel motor DM, a speed-limiting regulating generator LR may be provided for controlling the energization of the speed-limiting field winding 40 of the regulating generator CR. The regulating generator LR may comprise an armature 45, a pattern field winding 46, a voltage field winding 47 and an IR drop compensation field winding 48.

The field winding 46 may be connected to a suitable source of electrical energy through a rectifier device 50, which may be connected in current-blocking relation therein. The armature 45 of the regulating generator LR may be connected in circuit relation with the field winding 46 to produce a voltage in opposition to that of the source for energizing the field winding 40 only when the speed of the reel motor DM exceeds a predetermined speed for any given speed of the mill.

The voltage field winding 47 may be connected across the armature 26 of the reel motor DM through a control resistor 52 for producing a voltage across the armature 45 in opposition to that of the source. The pattern field winding 46 may be connected to the pilot generator PG through a control resistor 54 in opposed relation with the field winding 47. The IR drop compensation field winding 48 may be connected across the series field winding 27 of the reel motor DM through a control resistor 55 in a cumulative sense with respect to the pattern field winding 46.

Energization of the field winding 28 of the reel motor DM may be provided by connecting the field winding to a source of control voltage through control resistors 43 and 44, and utilizing an E. M. F. regulating generator ER comprising an armature 56, a pattern field winding 57, a voltage field winding 58, a current field winding 59, an anti-hunt field winding 60 and a self-energizing field winding 61 in shunt circuit relation with the winding 28 for varying the energization thereof.

The pattern field winding 57 may be energized from the pilot generator PG in opposed relation to the voltage field winding 58, which may be energized in accordance with the voltage across the armature 26 of the reel motor DM. The current field winding 59 may be connected across the series field winding 27 of the reel motor DM in opposed relation to the voltage field winding 58, so that together these field windings have a magnetizing effect which is proportional to the E. M. F. of the reel motor, and in opposition to that of the pilot generator PG. The self-energizing field winding 61 may be connected in series circuit relation with the main field winding 28 and either the regulating generator ER or the source. The anti-hunt field winding 60 may be connected across the series circuit connection of the main field winding 28 and the anti-hunt field winding 61.

A rectifier device 62 may be connected in circuit relation with the regulating generator ER and the field windings 28 and 61, so as to prevent a reduction in the excitation of the field winding 28 below a predetermined minimum value.

In order to provide for controlling the operation of the reel motor, stop and start push-button switches 64 and 65 may be utilized for controlling the operation of a delivery start relay DST. The connection of the reel motor generator DG to the armature 26 may be controlled by a delivery motor contactor DMC having an operating winding 66 disposed to be energized upon operation of the delivery start relay DST.

In order to prevent starting the reel motor when the voltage of the generator DG is too high, over-voltage relays DVR and DMS may be provided for interrupting the energizing circuit for the operating winding 66 of the delivery motor contactor DMC. The operating winding 67 of relay DVR may be connected across the armature of the generator DG, while the operating winding 69 of the relay DMS may be connected across the armature 26 of the reel motor DM.

A dynamic braking relay DB having an operating winding 70 may be provided for controlling the operation of a brake device B, and providing a dynamic braking circuit for the reel motor DM under the control of the delivery motor contactor DMC.

The speed-limiting regulating generator LR may be connected to the speed-limiting field winding 40 by means of a speed-limiting regulating contactor SLR having an operating winding 72, which may be energized through a circuit including contact members of the delivery motor contactor DMC and a contact member of the main switch MS.

In order to provide for move efficient control of the reel motor speed, control means, such as the speed-limiting recalibration relay DR2 having an operating winding 75, may be provided for controlling the field excitation of the speed-limiting regulating generator LR. The operating winding 75 may be energized through operation of an auxiliary relay DRC having an operating winding 76 energized through a contact segment 24a on the mill rheostat 24. The contact segment 24a may be so positioned as to be engaged by the movable contact element 24c to effect operation of the auxiliary relay DRC when the rheostat 24 is operated to produce a predetermined mill speed, for example, thirty to forty per cent of rated mill speed.

The recalibrating relay DR2 may be disposed to normally shunt portions of the control resistors 52, 54 and 55 in the voltage, pattern and current field windings of the speed-limiting regulating generator LR. Upon operation of the recalibration relay DR2, additional resistance will be inserted in the energizing circuit of these field windings so as to reduce the sensitivity of the speed-limiting regulating generator LR at the higher mill speeds.

In operation, the main switch MS will be closed to start the mill, whereupon the speed-limiting regulating generator contactor SLR will operate when the delivery motor contactor DMC is energized. This condition will be obtained in response to operation of the start push button 65, which provides an obvious energizing circuit for the delivery start relay DST.

An energizing circuit will thereupon be provided for the operating winding 66 of the contactor DMC extending from negative through the operating winding 66, conductor 78, contact members DMSa, conductor 80, contact members DVRa and contact members DSTc. Operation of contactor DMC provides obvious energizing circuits for the current-regulating generator and voltage-regulating generator switches DCR and DER, respectively.

When the mill is started without the strip being attached to the reel 12, the current-regulating generator CR would initially attempt to increase the voltage of the generator DG to regulate for a value of current corresponding to normal tension in the strip. This means that the regulating generator CR would raise the voltage of the generator DG and increase the speed of the reel motor DM to a dangerously high value.

However, as soon as the speed of the reel motor DM exceeds a predetermined value for a given speed of the mill, for example 120 R. P. M. in excess of the mill speed, the voltage field winding 47 of the regulating generator LR predominates over the pattern and current field windings 46 and 48 thereof, so that the output voltage of the regulating generator LR rises. The speed-limiting field winding 40 of the regulating generator CR is thereupon energized in such a direction as to lower the value of current for which the regulating generator CR is attempting to regulate. This reduces the output voltage of the generator DG, and limits the speed of the reel motor DM.

When the strip 13 is wrapped on the reel 12, the differential between the cumulative magnetomotive forces of the pattern field winding 46 and the current field winding 48, and the magnetomotive force of the voltage field winding 47 will be reduced to substantially zero. Since the speed of the reel motor is now determined by the speed of the strip 13, being delivered by the mill 15, the energization of the speed-limiting field winding 40 thereupon drops to a zero value, and the regulating generator CR continues to regulate for a predetermined value of current in the armature of the reel motor DM in the usual manner. As the strip 13 is wound on the reel 12, the E. M. F. of regulating generator ER regulates for a substantially constant value of reel motor E. M. F., thereby compensating for the continuously increasing diameter of the coil on the reel 12 in the usual manner.

When the mill is initially started, it will be usually run at a relatively low speed for threading the strip 13. During this operation, the auxiliary relay DRC will be in the deenergized position, and the speed-limiting recalibrating relay DR2 will remain in the deenergized position, shunting out portions of the control resistors 52, 54 and 55. This means that the sensitivity of the speed-limiting regulating generator LR may be increased in the lower speed ranges so that the reel motor may go to a maximum, for example of 120 R. P. M., above the speed which is correct for a given mill speed. This amount is approximately ten per cent of the top reel motor speed.

When, however, the rheostat 24 is operated to a position in which the mill generator MG develops about thirty to forty per cent of its normal voltage, the auxiliary relay DRC will be energized and provide an obvious energizing circuit for the speed recalibrating relay DR2. Operation of relay DR2 removes the shunt from portions of the control resistors 52, 54 and 55, thus increasing the impedance in the respective field circuits and reducing the sensitivity of the speed-limiting regulating generator LR. The generator may thus, for example, so control the energization of the speed-limiting field winding 40 that the reel motor may operate at a maximum of about thirteen per cent over speed.

Referring to Fig. 2, it will be seen that instead of connecting the armature 45 of the speed-limiting regulating generator LR in circuit relation with the source through a voltage divider as in Fig. 1, the armature 45 may be connected in closed circuit relation with the field winding 40 of the regulating generator CR and the rectifier device 50, through a contact member of contactor SLR. The field windings 46, 47 and 48 may be connected as in Fig. 1, and an additional bias field winding 49 may be provided. The bias field winding 49 may be connected to a suitable source of direct current through an adjustable resistor 49' so as to provide an output voltage opposed by the rectifier device 50, and which must be overcome before the E. M. F. field produced by the windings 47 and 48 can effect energization of the field winding 49. In operation the system functions substantially as described in connection with the system of Fig. 1.

From the above description and the accompanying drawing, it will be apparent that I have provided in a simple and effective manner for effectively controlling the free speed of a reel motor both during a threading operation, and also during a winding operation when the strip may break. The transfer from current to speed regulation is effected quickly and smoothly and without the use of any relays. This provides a simple and effective system, which is reliable and requires a minimum of maintenance in operation.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In a control system for a motor connected in driving relation with a reel device associated with mill apparatus, generating means connected to supply electrical energy to the motor, regulating means, circuit means connecting the regulating means to normally control the output voltage of the generating means to maintain the armature current of the motor at a predetermined value, additional regulating means, circuit means connecting said additional regulating means to control the aforesaid regulating means to affect the operation of the generating means to maintain a predetermined speed relation of the motor and the mill apparatus, only when the motor exceeds said predetermined speed relation with the mill apparatus.

2. In a control system for a reel motor connected in driving relation with a reel handling a strip of material from mill apparatus, generating means connected to supply electrical energy to the motor, regulating means, circuit means connecting the regulating means to normally regulate the output voltage of the generating means to maintain a predetermined value of reel motor armature current, additional regulating means associated with the said regulating means, and circuit means including a blocking rectifier and means for producing a bias voltage connecting the additional regulating means to affect the operation of the regulating means only when the speed relation of the reel motor and the mill apparatus reaches a predetermined value.

3. In a control system for a motor connected in driving relation with a reel device for handling a strip of material from a rolling mill, generating means connected to supply electrical energy to the motor, a regulating generator having a plurality of field windings, circuit means connecting one of said windings for energization in accordance with the armature current of the reel motor, circuit means including a rectifier device connecting another of said windings to a source of control voltage in a current blocking sense, and an additional regulating generator responsive to a predetermined speed condition of the reel motor connected in opposed relation with the source of control voltage.

4. In a control system for a motor connected in driving relation with a reel device disposed to wind a strip of material proceeding from a work device, regulating means, circuit means connecting and regulating means to provide field excitation for the motor to maintain a predetermined value of motor E. M. F., generating means operable to supply electrical energy to the motor, additional regulating means, circuit means connecting the additional regulating means to normally regulate the supply of electrical energy in accordance with the value of the armature current, speed regulating means, and circuit means including unidirectional current means and blocking voltage means connecting the speed regulating means to effect operation of the additional regulating means in accordance with the speed relation of the reel motor and the work device when said relation exceeds a predetermined value.

5. A control system for a reel motor connected in driving relation with a delivery reel for winding a strip delivered by a mill stand comprising, a generator connected to supply electrical energy to the reel motor, a regulating generator having a plurality of field windings connected to provide field excitation for the generator, circuit means connecting one of said field windings for energization in accordance with the armature current of the reel motor, and additional circuit means including a rectifier device and a control generator connecting another one of said field windings to a source for energization only when the reel motor exceeds a predetermined speed relation with the mill stand.

6. In combination with a reel motor having a field winding and an armature connected in driving relation with a delivery reel for winding a strip proceeding from a mill stand, regulating means, circuit means connecting the regulating means to vary the energization of the field winding to maintain a substantially constant motor E. M. F., generating means connected to supply electrical energy to the motor armature, additional regulating means, circuit means connecting the additional regulating means to vary the output voltage of the generating means to maintain a predetermined value of motor armature current, means including a control generator selectively responsive to the speeds of the mill stand and the reel motor, and circuit means including rectifier means connecting the control generator to control the operation of the additional regulating means to limit the output voltage of the regulating generator only when the reel motor exceeds a predetermined speed relation with the mill stand.

7. The combination in a control system for a reel device, of a motor having a field winding and an armature connected in driving relation with the reel device, a regulating generator connected to supply electrical energy to the field winding, generating means disposed to supply electrical energy to the armature, a regulating generator having a plurality of field excitation windings connected to control the output voltage of the generating means, circuit means connecting a first one of said field windings to a source of constant voltage, additional circuit means connecting a second one of said field windings for energization in accordance with the armature current of the motor, circuit means connecting a third one of said field windings to a source of constant voltage, rectifier means connected in blocking relation with said third one of said field windings and source, and a control generator connected in circuit relation with said third one of said field windings in opposed relation with the source, said control generator being responsive to the E. M. F. of the reel motor.

8. In a control system for a reel device disposed to cooperate with mill apparatus having speed control means, a motor connected in driving relation with the reel device, generating means connected to supply electrical energy to the reel motor, a regulating generator, circuit means connecting the regulating generator to control the output voltage of the generating means, said regulating generator having a plurality of field windings, an additional regulating generator, circuit means connecting said additional regulating generator to effect energization of one of said windings only when the reel motor exceeds a predetermined speed relation with the mill apparatus, control means, circuit means connecting the control means to effect variation of the output of the additional regulating generator relative to the speed of the motor in accordance with predetermined operating position of the speed control means of the mill apparatus.

9. The combination in a control system for a reel device associated with mill apparatus having a speed controlling rheostat therefor, of a motor connected in driving relation with the reel device, generating means connected to supply electrical energy to the reel motor, a regulating generator connected to supply field excitation to the generating means, said regulating generator having a plurality of field windings, circuit means connecting a first one of said field windings for energization in accordance with the motor armature current, additional circuit means connecting a second one of said field windings to a source of control voltage in opposed relation to said one winding, circuit means including a control generator connected to energize a third one of said field windings, said generator having excitation means, circuit means connecting the excitation means for energization in accordance with the speed of the motor, and control means operable in accordance with operation of the speed control means to vary the energization of the excitation means of the control generator.

10. In combination in a control system for a reel device associated with a mill stand, a motor having an armature connected in driving relation with the reel device and a field winding, circuit means connecting the field winding to a source of electrical energy, generating means connected to supply electrical energy to the motor armature, a regulating generator disposed to supply field excitation to the generating means, said regulating generator having a plurality of field windings including one field winding energized from a source of control voltage and an opposed field winding energized in accordance with the armature voltage of the motor, circuit means including a rectifier device connecting another of said plurality of field windings to a source of control voltage in blocking relation, a control generator connected in circuit relation with said another winding in opposed relation with the source, said control generator having a plurality of field windings including one field winding disposed to be energized in accordance with the speed of the mill stand and another field winding in an opposed sense in accordance with the motor armature voltage, and control means operable to vary the energization of said field windings jointly.

11. In a control system for a motor connected in driving relation with a reel device for handling a strip of material from a work device, generating means connected to supply electrical energy to the motor, a regulating generator normally disposed to regulate the output voltage of the generating means in accordance with the armature current of the reel motor, an additional regulating generator having a plurality of field windings, a rectifier device connecting the additional regulating generator to modify the output voltage of said regulating generator, circuit means connecting one of the field windings of the additional regulating generator to a source of control voltage to produce an output voltage opposed in sense to the rectifier device, and additional circuit means connecting at least another of said field windings to produce an output voltage in accordance with a differential between the speed of the work device and the counter E. M. F. of the reel motor.

References Cited in the file of this patent

UNITED STATES PATENTS

| Number | Name | Date |
|---|---|---|
| 2,264,277 | Cook | Dec. 2, 1941 |
| 2,339,939 | Michel | Jan. 25, 1944 |
| 2,342,790 | Cook | Feb. 29, 1944 |
| 2,432,876 | Formhals et al. | Dec. 16, 1947 |
| 2,437,973 | Schmitz | Mar. 16, 1948 |
| 2,444,248 | Crever | June 29, 1948 |
| 2,451,901 | Auburn | Oct. 19, 1948 |
| 2,454,183 | Kenyon | Nov. 16, 1948 |